United States Patent [19]

Bailly

[11] 4,179,014

[45] Dec. 18, 1979

[54] MECHANISM FOR LOCKING A PLATE WHICH IS MOVABLE ON A TABLE ALONG GUIDE MEANS

[75] Inventor: Emile Bailly, Les Lilas, France

[73] Assignee: Compagnie International pour l'Informatique Cii-Honeywell Bull, Paris, France

[21] Appl. No.: 889,516

[22] Filed: Mar. 23, 1978

[30] Foreign Application Priority Data

Apr. 19, 1977 [FR] France .............................. 77 11743

[51] Int. Cl.² ............................................. B61H 13/00
[52] U.S. Cl. ..................................................... 188/43
[58] Field of Search ................................. 188/40–44, 188/67, 188, 189

[56] References Cited

U.S. PATENT DOCUMENTS

| | | | |
|---|---|---|---|
| 3,489,250 | 1/1970 | Kuhlmann | 188/42 |
| 3,741,349 | 6/1973 | Banks | 188/42 |
| 4,014,413 | 3/1977 | Monks | 188/44 X |

FOREIGN PATENT DOCUMENTS

7748 of 1915 United Kingdom.
674033 2/1947 United Kingdom.
805255 5/1955 United Kingdom.

*Primary Examiner*—Duane A. Reger
*Attorney, Agent, or Firm*—Lowe, King, Price and Becker

[57] ABSTRACT

A plate is locked in situ on a table that has a guide for controlling the movement of the plate in a predetermined direction. A pair of members are moved between a first position where they are applied to fixedly connect the plate to the guide and a rest position where the plate can be moved. Ramps are inclined relative to the predetermined direction of the guide. The ramps and member are positioned so the member is movable between the first and rest positions along the ramps. The ramps cooperate with the member and are displaceable substantially in the predetermined direction as the plate moves on the guide.

14 Claims, 6 Drawing Figures

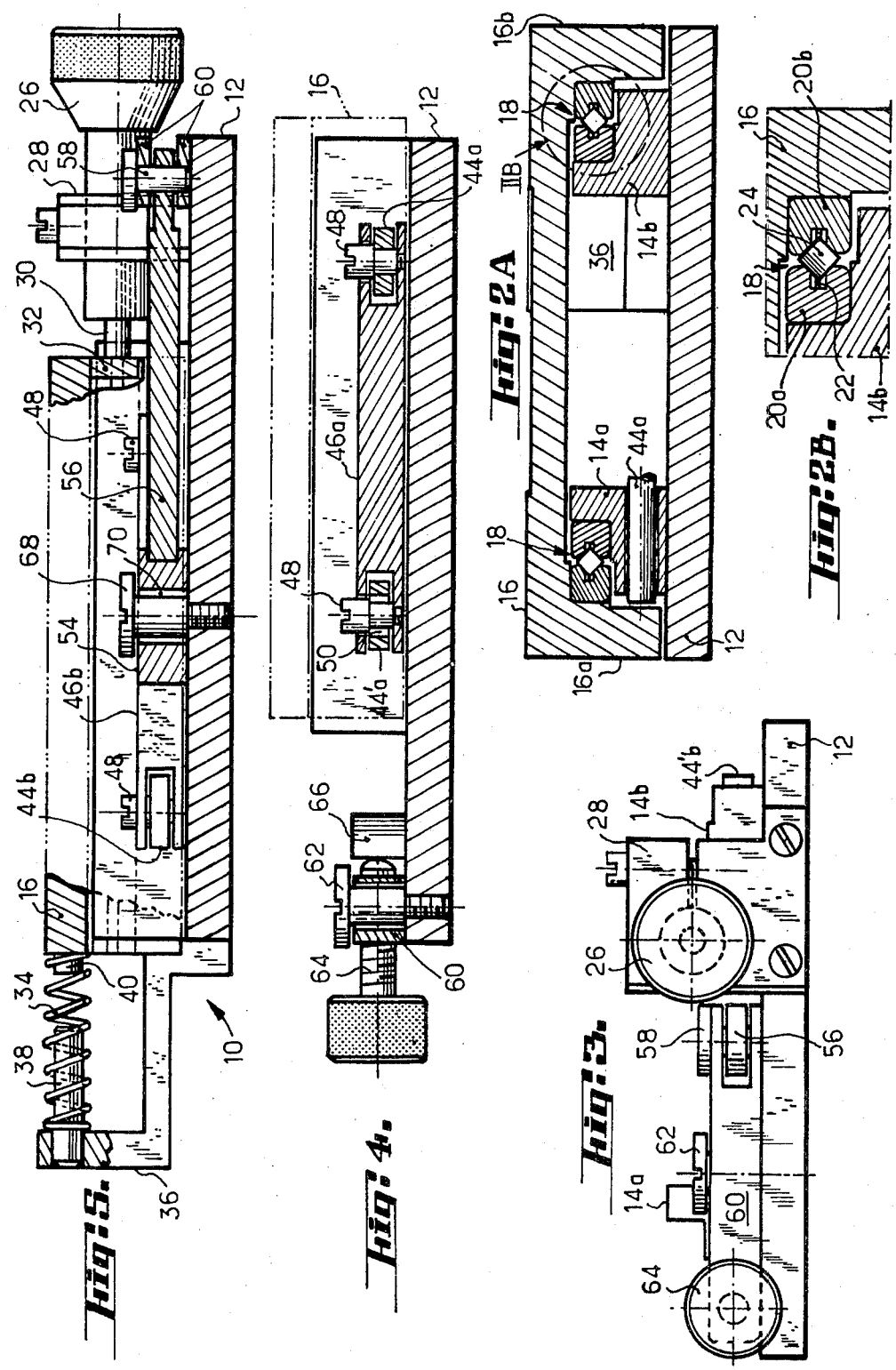

MECHANISM FOR LOCKING A PLATE WHICH IS MOVABLE ON A TABLE ALONG GUIDE MEANS

FIELD OF THE INVENTION

The present invention relates to a mechanism for moving a plate on a table along guide means.

BACKGROUND OF THE INVENTION

Previously, a mechanism was developed to brake and/or lock a plate which is moved by slide guides on rails. Typically, the plate is manually driven on the rails and frequently expedients were adopted in order to avoid having to use locking means.

In one configuration, the plate was manually shifted by a lead screw and held in position by resilient return springs which pressed the plate against the end of the screw. When the plate was moved on rails by a lead screw, the plate was held in situ merely by fixing the screw position. This mechanism, however, is incapable of maintaining the plate at an accurate and stable position if the plate is in a situation where it may be upset, as can happen when operations are performed on it at its correct position. One of the upsetting operations involves moving a second plate on the first plate in a direction which is generally orthogonal to the first plate; such an arrangement is generally referred to as a compound table. In a compound table, it is difficult to position the second plate accurately because its movement includes components in the direction of movement of the first plate which is caused by the movement of the second plate. Another typical upsetting operation occurs in response to actions which may be performed on a part arranged on the plate; such an action involves fitting components to a part by welding, using positioning heads and welding heads.

BRIEF DESCRIPTION OF THE INVENTION

The invention overcomes these disadvantages by incorporating a simple and effective locking mechanism which ensures that the plate remains steady in the correct position.

According to the invention, a plate is moved in a predetermined direction on a table along a guide means and is characterized by a new and improved mechanism for locking the plate in position. The locking mechanism includes at least one member which is moved between a first position where it is applied to the plate to fixedly connect the plate to the guide means and a rest position where the plate can be moved. The locking mechanism is moved between these two positions by a ramp which is inclined relative to the predetermined direction. The ramp cooperates with the locking mechanism and is displaceable substantially in the predetermined direction.

It is accordingly an object of the invention to provide a new and improved locking mechanism for a plate which is translated along guides of a table.

Another object of the invention is to provide a new and improved mechanism for locking a plate to a table over which the plate moves on a guide, wherein the plate remains stable and accurately locked in position, even if the plate is upset.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 2A is a sectional view of the line II—II shown in FIG. 1;

FIG. 2B is an enlarged view of the portion indicated as IIB in FIG. 2A;

FIG. 3 is an end-on view of the table illustrated in FIG. 1, without a plate;

FIG. 4 is a sectional view taken on the line IV—IV shown in FIG. 1; and

FIG. 5 is a sectional view taken on the line V—V shown in FIG. 1.

DETAILED DESCRIPTION OF THE INVENTION

Figure 1:
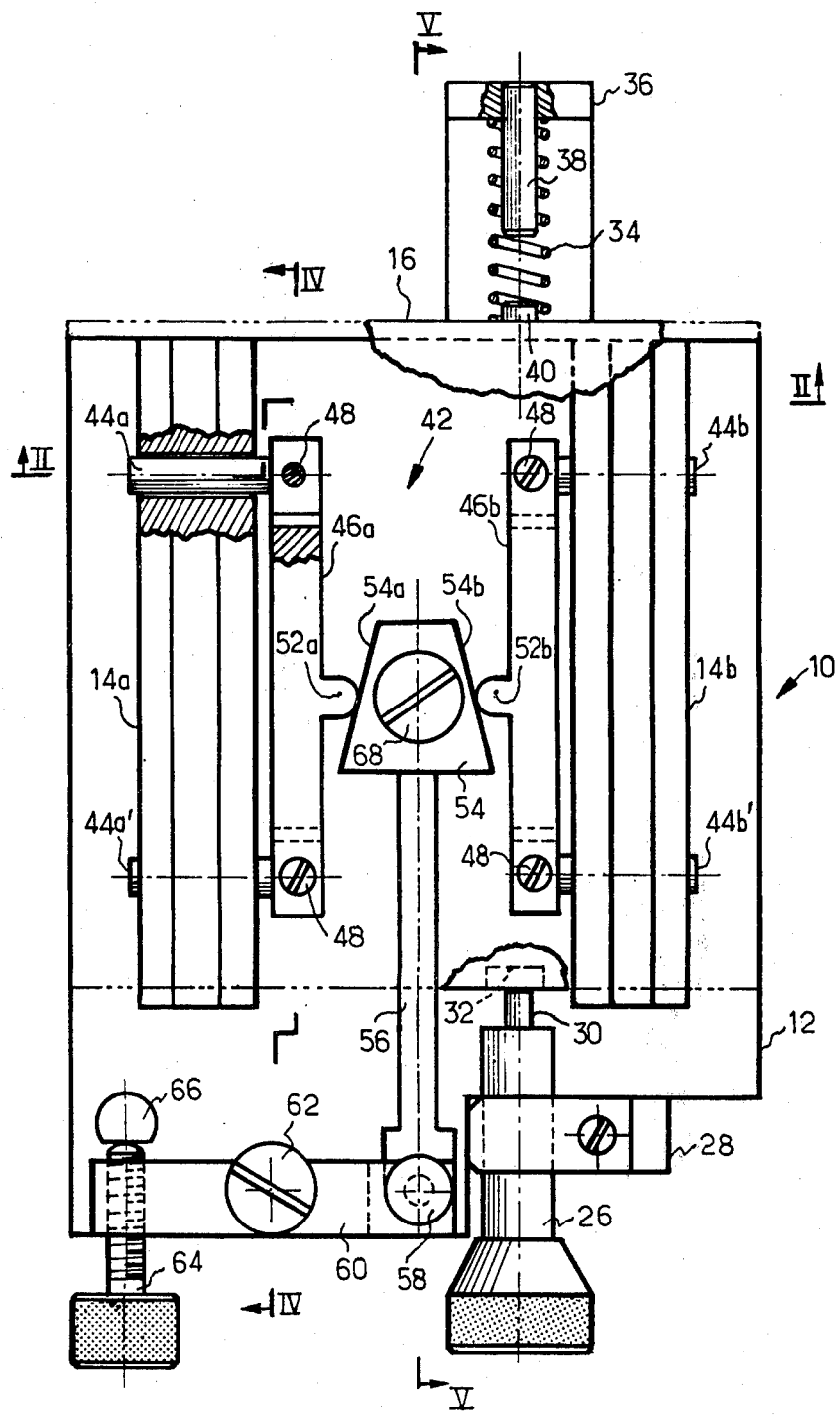
FIG. 1 is a top view of a two rail table; in this Figure, the table is shown without any associated sliders and incorporates a preferred embodiment of a locking mechanism that positions a plate, the outline of which is indicated by a dotted line; only certain parts of the plate are illustrated in this top view.

Arrangement 10, shown in the Figures as an illustrative embodiment of the invention, comprises a table 12 including two straight parallel rails 14a and 14b that provide guidance in a predetermined direction. Rails 14a and 14b determine the longitudinal direction of arrangement 10, and of a plate 16. Plate 16 has two flanges 16a and 16b in its longitudinal direction and is movable along the rails 14a and 14b by means of guides 18, illustrated in the drawings as caged-roller guides. Each guide 18, details of which are seen more clearly in FIG. 2B, includes two sliders 20a, 20b, respectively attached to the table, via the corresponding rail (14b in FIG. 2B) and to the plate. Slides 20a and 20b are connected together by a roller cage 22 which houses a series of rollers 24, inclined at 45° alternately to left and right. The guide of this nature which was used to produce the arrangement described and illustrated is known, and is available from Messrs. Schneeberger under the type number R2090. It is to be understood, however, that other guides can be employed and that the illustrated guide is merely exemplary.

The plate 16 is translated by means of micrometer screw 26, having a body detachably held by a set screw on a support plate 28 attached to table 12. Micrometer screw 26 includes a movable shank 30 having one end effectively urged by spring 34 against abutment 32 on plate 16. One end of spring 34 bears against the flange of plate 16 which is opposite from the flange bearing against abutment 32; the other end of spring 34 bears against a fixed projection 36 which is secured to and spaced from table 12. Projection 36 carries an end-of-travel stud 38 having a free end facing abutment stud 40, attached to the plate 16.

As described up to this point, arrangement 10 is a typical example of a prior art arrangement in which a plate 16 is locked in position by a spring 34. However, this locking of plate 16 is resilient and thus does not ensure complete steadiness when, for example, the plate is vibrated during operations which are likely to take place when it is correctly positioned. The invention provides a locking mechanism 42 which maintains plate 16 perfectly steady.

Locking mechanism 42 is secured to the table 12 and includes four movable pins 44, grouped in pairs for each rail so that parallel pins 44a and 44a' pass through rail 14a perpendicularly, while parallel pins 44b and 44b' respectively have free ends facing the first and second flanges 16a and 16b on the plate 16, as shown by FIG. 2A. The other ends of pins 44a, 44a', 44b, 44b' are respectively mounted to rotate freely in first and second bars 46a and 46b. To this end, the ends of bars 46 form clevises in which the corresponding ends of pins 44 are inserted, and engaged by smooth portions on the shanks of four set screws 48 that pass through one arm of the clevises and the corresponding end of a pin; the threaded portion of screws 48 is threaded into the other arm of the clevises. In accordance with a feature of the invention as illustrated in FIG. 4, one pair of screws 48 passes through the pins 44a and 44b to permit only rotary movement about themselves, whereas the other two screws 48 pass through slots in pins 44a' and 44b'; the slots extend in the longitudinal direction of arrangement 10.

Bars 46a and 46b respectively have rounded projections 52a and 52b which cooperate with inclined ramps 54a and 54b on a trapezoidal shaped cam 54. In the embodiment illustrated, ramps 54 are inclined at 30° to the longitudinal direction of the rails 14. Cam 54 is connected to one end of a shank 56, having a second end mounted so it is free to rotate about a pivot screw 58 in a clevis formed by one end of a lever 60 (FIG. 5). Lever 60, rockable about a pivot screw 62 (FIG. 4), has a second end with a threaded bore that extends in the longitudinal direction of arrangement 10. The threaded bore receives a locking screw 64, having an end shank that presses against abutment 66.

The shank of a pivot screw 68 also passes through an opening 70 (FIG. 5) in cam 54. Cam 54 has a cross-section relative to that of the shank of screw 68, which provides clearance for the cam in all directions while the threaded part of pivot screw 68 is screwed into a threaded bore of table 12.

The operation of locking mechanism 42 of the arrangement 10 is clear from the foregoing description. As a result of action by locking screw 64, lever 60 drives shank 56 and cam 54 in a substantially longitudinal direction as permitted by opening 70 in cam 54. Because of opening 70, if the longitudinal movement of cam 54 takes place in the direction leading from the bottom to the top of FIG. 1, ramps 54a and 54b respectively pass independently against bars 46a and 46b which in turn press against pins 44. The travel of the pins 44 ends when they bear against flanges 16a and 16b of plate 16 (FIG. 2A). The pins 44 are then in an "applied" position, where they fixedly connect plate 16 to the rails 14. The independence between the locking by the first pins 44a and 44a' and the locking by the second pins 44b and 44b', which is due to the presence of the opening 70, ensures that all the pins 44 apply equal forces to plate 16.

If cam 54 is then moved in the opposite direction, i.e., downwardly in FIG. 1, pins 44 no longer apply any force to plate 16 and assume a rest position which allows the plate to be moved. Slots 50, which allow pins 44a' and 44b' to pivot, enable bars 46 to pivot slightly about projections 52, thus preventing the bars 46 from jamming. Jamming of bars 46 would result in the corresponding pins 44 becoming wedged in their bores through rails 14, thus preventing the pins from taking up the "applied" position. This feature thus also contributes to equalizing the applied forces.

To sum up, the notable advantages afforded by the locking mechanism of the invention are the simplicity of its structure and the positive locking, which takes place in a direction transverse to arrangement 10 to hold plate 16 in position equally in both the longitudinal and transverse directions. In addition, by using four locking pins, the cross-sectional application area of the pins is considerably reduced and the exerted locking forces are uniformly distributed. Consequently, effective locking can be achieved with small forces, which has the additional advantage of not exerting stresses on sliders 20. This characteristic is further enhanced by the linkages of pins 44 to bars 46 and by the clearance which cam 54 has, which enables the applied forces to be equalized.

According to the invention, numerous modifications may be made to the locking mechanism which has just been described and illustrated. For example, return means, such as springs, can bias pins 44 or bars 46 toward a rest position. Also, it is clear from the above description that in the extreme case, locking could be performed by a single movable member 44, having one end that rests against a ramp formed by the inclined face of cam 54 in the shape of a right-angled trapezoid. Cam 54 would then be mounted to be movable only in the longitudinal direction (for example by making the opening 70 a slot which extends only in the longitudinal direction). However, it has been found that the use of four pins, as in the illustrated embodiment, has the advantage that plate 16 is locked in position in a uniform fashion and that stress is not exerted. It may also be desirable to use many more pins 44 if, for example, the maximum lengthwise travel of plate 16 is a number of times greater than the length of the plate in the longitudinal direction. Cam 54 may also be driven by a mechanism other than a lever 60. Locking can also be controlled by a motor, i.e., by other than manual means. It is also possible for a mechanism according to the invention to be secured to plate 16 and for its pins to press in their applied position, against rails 14, instead of locking mechanism 42 being secured to the table 12.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A mechanism for locking a plate in situ on a table provided with means including two rails for guiding movement of the plate in a predetermined direction comprising at least one member which is secured to the table and is movable between a first position where it is applied to fixedly connect the plate to the guide means and a rest position where the plate can be moved, a ramp inclined relative to the predetermined direction of the guide means, the ramp and member being positioned so the member is movable between the first and rest positions, the ramp cooperating with said member and being displaceable substantially in the said predetermined direction, means for pressing said movable member against the plate, in its applied position, to connect the table fixedly to the guide means, first and second members passing through respective ones of the said rails, and two bars for connecting one end of each of said members together, each of said bars having two projections which cooperate with two inclined ramps.

2. The mechanism of claim 1 wherein both of said inclined ramps are respectively opposite faces of a single cam member, said cam member being mounted to be displaced substantially in the given direction so that the two inclined ramps cooperate independently of the first and second members, respectively.

3. The mechanism of claim 2 wherein the first and second members are mounted to rotate freely in the bars.

4. The mechanism of claim 3 wherein at least one of the first and second members is mounted to be free to translate in the predetermined direction on the bars.

5. The mechanism of claim 2 wherein the two inclined ramps are respectively two faces of a single cam member attached to a shank, said shank having an end mounted to be freely rotatable in one end of a lever, the locking screw bearing against an abutment and passing through another end of the lever.

6. The mechanism of claim 1 wherein the first and second members are mounted to rotate freely in the bars.

7. The mechanism of claim 6 wherein at least one of the first and second members is mounted to be free to translate in the predetermined direction on the bars.

8. The mechanism of claim 2 wherein the inclined ramp is a face of a cam member attached to a shank, said shank having an end mounted to be freely rotatable in one end of a lever, the locking screw bearing against an abutment and passing through another end of the lever.

9. A mechanism for locking a plate in situ on a table provided with at least two guiding surfaces for guiding movement of the plate in a predetermined direction, comprising members movable between a first position where they are applied to fixedly connect the plate to said guiding surfaces at at least three contact areas and a rest position where the plate can be moved, at least one bar connecting one end of certain of said members together and having a projection, and ramp means inclined relative to said predetermined direction and freely movable substantially in the plane of said contact areas, said ramp means cooperating with said projection of said bar and with the remaining of said members for moving all of said members between said first and rest positions when said ramp means are displaced substantially in said predetermined direction.

10. The mechanism of claim 9, wherein said certain members are linked to said bar in said plane of said contact areas.

11. The mechanism of claim 9, wherein said members extend substantially along a given direction between said first and rest positions and at least one of said certain members is mounted to freely translate in said given direction of said bar.

12. The mechanism of claim 9, wherein said members comprise first and second members respectively connected to first and second bars, each having a projection cooperating with said ramp means.

13. The mechanism of claim 9, wherein said contact areas form a variable locking fixture and are substantially contact points with respect to said fixture.

14. The mechanism of claim 13, wherein said members comprise first and second members respectively connected to first and second of said bars, each of said members including one of said projections, the ramp means including two oppositely inclined ramp surfaces selectively connected to the projections on the first and second bars, respectively.

* * * * *